June 28, 1927.
R. J. WENSLEY
1,633,965
MOTOR STARTING SYSTEM
Original Filed June 3. 1920
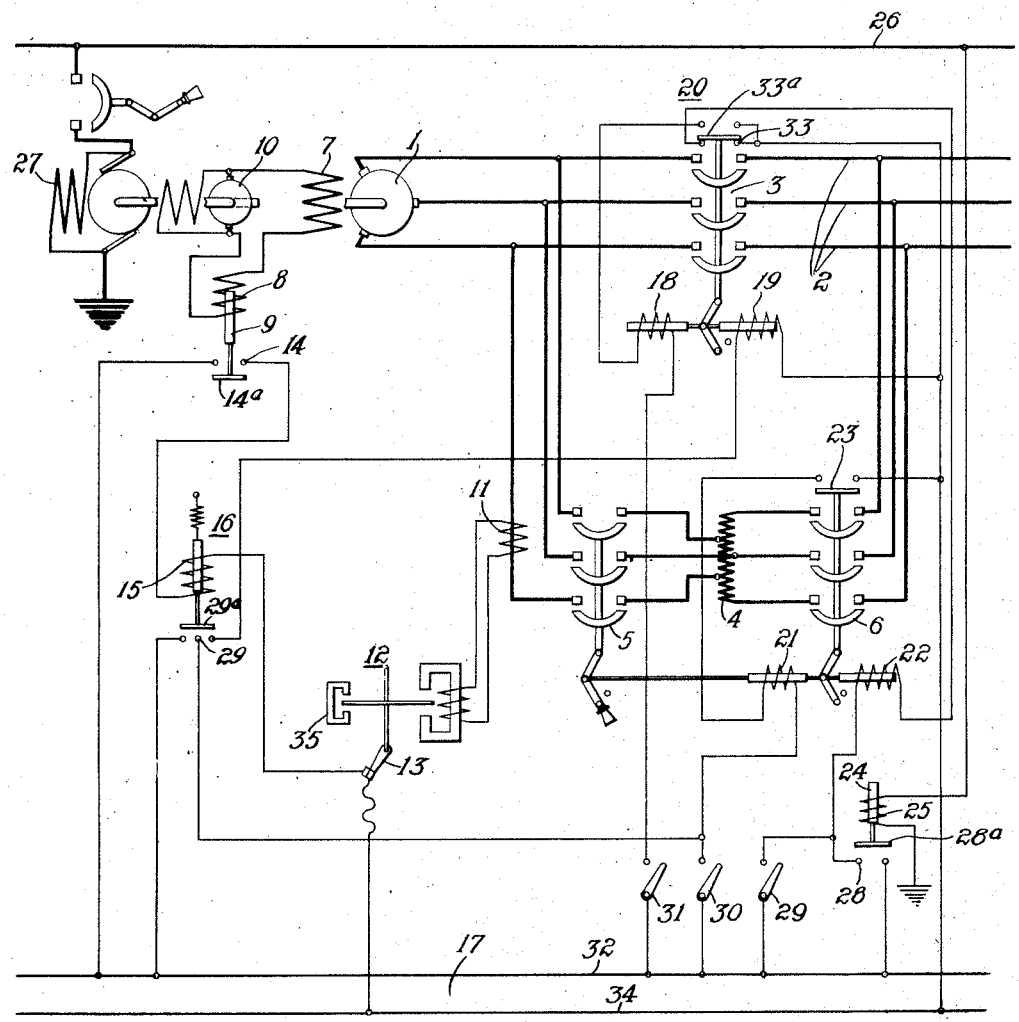
WITNESSES:
INVENTOR
Roy J. Wensley
BY
ATTORNEY Patented June 28, 1927.

1,633,965

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-STARTING SYSTEM.

Application filed June 3, 1920, Serial No. 386,322. Renewed July 25, 1923.

My invention relates to motor-starting systems and particularly to systems for starting synchronous motors.

One object of my invention is to provide means for starting the motor of a synchronous motor-generator set in an automatic railway substation.

Another object of my invention is to provide a synchronous-motor-starting system wherein the actuation of the running circuit interrupter is controlled by predetermined conditions in the motor windings.

Another object of my invention is to provide a system of the above-indicated character wherein the actuation of the running circuit interrupter is controlled by a relay that is responsive to direct current in the field winding of the motor and a relay that is responsive to a predetermined minimum value of current in the armature windings of the motor.

Another object of my invention is to provide means for precluding connection of a synchronous motor directly to a source of electromotive force of normal value until the speed of the motor corresponds to the synchronous speed that is determined by the source of electromotive force.

A further object of my invention is to provide a system, of the above-indicated character, that shall be automatic, simple and reliable in its operation.

In starting a synchronous motor, a reduced electro-motive force is ordinarily applied to the armature windings in order to preclude the flow of currents of excessive value therein. The armature windings are energized from the source of reduced electromotive force until the motor attains its synchronous speed and they are then disconnected from the source of reduced electromotive force and directly connected to the circuit of normal electromotive force from which they are to be energized. If the motor windings are connected to the circuit before the motor has attained its synchronous speed, excessive currents will be caused to traverse the windings and heavy surges will be produced in the circuit.

Ordinarily, a synchronous motor has an exciter directly connected thereto for energizing the field-magnet winding of the motor. While the motor is starting, the magnetic fluxes, that are induced by the currents traversing the armature windings of the motor, induce an alternating electromotive force in the field-magnet winding of the motor. Since the field-magnet winding of the motor is directly connected across the terminals of the exciter generator armature, and the voltage of the exciter generator is built up slowly, the field-magnet winding is traversed by relatively small values of direct current until synchronous speed is reached. When the motor attains synchronous speed, the field-magnet winding of the motor is rotating at a speed corresponding to the synchronous speed of the motor and, since there is substantially no relative movement between the rotating field-magnet winding and the magnetic fluxes that traverse the stator of the motor, an alternating electromotive force is no longer induced in the rotating field-magnet winding. As this alternating electromotive force is gradually reduced to zero, the direct-connected exciter builds up and energizes the field-magnet winding by direct current. Moreover, while the motor is starting, the values of the currents that traverse the armature windings of the motor exceed the value of current that is required to maintain the motor rotating at its synchronous speed.

In practicing my invention, I provide a relay in the circuit of the field-magnet winding of the motor that is responsive to direct current only and a relay in the circuit of the armature windings of the motor that is energized, through a current transformer, in accordance with the starting current that traverses the armature windings of the motor. These two relays co-operate to energize means for connecting the armature windings of the motor directly to the source of normal electromotive force when the motor has attained its synchronous speed. The connection of the motor to the circuit is thus made dependent upon the reduction of the starting current that traverses the armature windings to a predetermined minimum value corresponding to the synchronous speed of the motor and upon the energization of the field-magnet winding of the motor by direct current from the exciter armature. Premature connecting of the motor to the circuit is thus prevented by the co-operation of two relays that are responsive to different conditions which result from the motor attaining synchronous speed.

In order that the operation of the motor-generator set may be fully automatic, the starting of the motor may be controlled by some means that is responsive to a predetermined condition. A drop in potential of a trolley feeder adjacent to an automatic railway substation may serve to actuate a relay to start the motor-generator set to furnish additional energy to the feeder, a circuit may be completed by a float device at a predetermined low level in a reservoir to energize a relay for starting the motor to operate a pump for refilling the reservoir, or, the starting may be controlled by an attendant.

The starting system herein disclosed may thus be employed in various applications where a synchronous motor is employed and may be made automatic by the application of a relay thereto that is responsive to a predetermined condition, upon the occurrence of which the operation of the motor is desired.

The single figure of the accompanying drawing is a diagrammatic view of an electrical system embodying my invention.

A synchronous motor 1 is adapted to receive energy from a source 2 of electromotive force through a circuit interrupter 3. To provide a reduced electromotive force for starting the synchronous motor 1, a plurality of auto-transformers 4 are employed that are connected between the armature windings of the motor and the source of electromotive force 2 by means of two circuit interrupters 5 and 6. The interrupters 5 and 6 are mechanically connected and are simultaneously actuated. The field-magnet winding 7 of the motor 1 is connected in series with a winding 8 of a direct-current relay 9, across the terminals of an exciter generator 10 that is mechanically connected to the motor. A current transformer 11 is so connected in the circuit of one of the armature windings of the motor as to have induced therein a current that is proportional to the starting current that traverses the motor winding and is employed to energize an inverse-time-element relay 12. Contact members 13 of the relay 12 and contact members 14 of the relay 9 are connected in series with a winding 15 of a relay 16, across a source 17 of constant electromotive force. The circuit interrupter 3 is provided with a tripping magnet 18, a closing magnet 19 and an auxiliary pallet switch 20. The starting-circuit interrupters 5 and 6 are provided with a tripping magnet 21, a closing magnet 22 and an auxiliary pallet switch 23. A control relay 24 is provided with a winding 25 that is responsive to a predetermined voltage on a trolley feeder conductor 26 which is supplied with energy from a generator 27 that is driven by the synchronous motor 1. A plurality of contact members 28 of the control relay 24 serve to complete a circuit for energizing the closing magnet 22 of the starting interrupters 5 and 6 to actuate the interrupters, when engaged by a bridging member 28ª.

A manually-operated switch 29 is connected in parallel relation with the contact members 28 of the control relay and serves as a manually-operated means for starting the motor 1. Two additional manually-operated switches 30 and 31 may be employed for manually tripping the starting and the running interrupters 6 and 3, respectively.

When the potential of the trolley feeder conductor 26 drops to, or below, a predetermined value, engagement is effected between the contact members 28 and 28ª, of the relay 24. A circuit is thereby completed from a conductor 32 of the circuit 17 through the winding of the closing magnet 22 of the interrupters 5 and 6 and through the contact members 33 and 33ª of the pallet switch 20 on the interrupter 3 to conductor 34 of the circuit 17. The closing magnet 22 is thereupon energized, and the interrupters 5 and 6, being mechanically interlocked, are simultaneously closed. When the interrupters 5 and 6 are closed, an electromotive force is impressed upon the armature windings of the motor 1 that produces a rotating magnetic field which starts the motor. Since the field-magnet winding 7 of the motor 1 is close-circuited through the winding 8 of the relay 9 and the armature windings of the direct-connected exciter generator 10, and since the exciter voltage builds up slowly, insufficient direct current will traverse the winding 8 to operate the relay until the motor has accelerated to synchronous speed. Upon the energization of the field-magnet winding 7 by the direct current from the exciter generator 10, the winding 8 of the relay 9 is also energized and, at a predetermined value of current, actuates the relay 9 to effect engagement of its contact members 14 and 14ª.

While the motor is starting, the value of the current that traverses the armature windings is large. As the motor gradually approaches synchronous speed, the value of this current decreases to a minimum value that corresponds to the synchronous speed of the machine. The relay 12, that is energized from the current transformer 11, is energized, therefore, in accordance with the value of the varying current as it decreases to the predetermined minimum value that corresponds to the synchronous speed of the machine.

The relay 12 is provided with a retarding magnet 35 to produce a time element that will preclude premature engagement of the contact members 13 if the motor should hunt while the speed of the rotor is gradually approaching synchronous speed. The contact members 13 are disengaged while the current traversing the relay 12 exceeds a predetermined value. When the current traversing the relay decreases to a predetermined value, the contact members 13 are engaged, after a short interval controlled by the magnet 35.

When the contact members 13 of the relay 12 are engaged and the contact members 14 and 14ª of the relay 9 are also engaged, upon the motor reaching synchronous speed, a circuit is completed from conductor 32 of the circuit 17, through the contact members 14 and 14ª of the relay 9, the winding 15, of the relay 16 and the contact members 13 of the relay 12, to the conductor 34 of the circuit 17. The relay 15, being thus energized, effects engagement of its contact members 29 and 29ª, whereupon two circuits are completed, one circuit serving to energize the closing magnet 19 of the running interrupter 3 and the other circuit serving to energize the tripping magnet 21 of the starting interrupters 5 and 6.

The armature windings are then directly connected to the conductors of the circuit 2 and have the full voltage of the circuit impressed thereupon. Since the motor has already attained its synchronous speed, no serious surges are occasioned by connecting the armature windings to the circuit 2. Since the actuation of the running interrupter 3 is determined by the co-operation of the two relays 9 and 12, the actuation of which is dependent upon the motor attaining its synchronous speed, the motor is safeguarded from being prematurely connected to the circuit 2.

The auxiliary switch 20 on the running interrupter 3 is employed to provide an electrical interlock that precludes actuation of the interrupters 5 and 6 except when the interrupter 3 is in its open position. The auxiliary switches 20 and 23 are also employed to provide auxiliary means for opening the circuit of the tripping windings of their respective interrupters 3 and 6.

The stopping of the motor may be variously controlled and made dependent upon predetermined conditions in a manner similar to the starting thereof, that is, the demand of energy from the generator or the level of the water in a reservoir may be used as controlling means for stopping the motor.

I, therefore, do not limit the application of my motor-starting system to an automatic railway or power substation embodying a synchronous motor-generator set nor do I limit my invention to the particular arrangement disclosed, as various modifications may be made therein within the spirit and scope of the invention, as set forth in the appended claims.

I claim as my invention:

1. In a system for starting a synchronous motor, the combination with a motor, a source of electromotive force and circuit interrupters, of means responsive to a minimum value of line current and means responsive to the energizing current in the field-magnet windings of the synchronous motor for actuating the interrupters.

2. The combination with a synchronous motor having its field-magnet windings energized from a direct-connected exciter generator, of means for starting the motor comprising means responsive to the energization of the motor-field-magnet windings and means responsive to the minimum value of current in the armature windings.

3. A system for starting a synchronous motor comprising a relay responsive to the energization of the motor-field-magnet windings and a relay responsive to the minimum value of current in the armature windings.

4. In a system for starting a synchronous motor, the combination with transformers for providing a low starting voltage and circuit interrupters for connecting the transformers between the armature windings and a source of electromotive force, of an interrupter for connecting the armature windings directly to the source of electromotive force, means responsive to the energization of the motor-field-magnet windings, and means responsive to a predetermined minimum value of current in the armature windings, said means co-operating to close the direct-connecting interrupter and simultaneously open the transformer interrupters.

5. In a system for starting a synchronous motor having its field-magnet energized from a direct-connected exciter generator, the combination with an interrupter for connecting the motor windings directly to an electric circuit and a plurality of interrupters for connecting the armature windings to the circuit through a plurality of transformers, of means for so interlocking the interrupters that the first-mentioned interrupter may be actuated only after the plurality of interrupters have been actuated to connect the armature windings to the circuit through the transformers, means responsive to the energization of the motor-field-magnet winding and means responsive to the minimum value of current in the armature windings co-operating to actuate the direct-connecting interrupter.

6. A system for starting a synchronous motor comprising a direct-connected exciter generator for energizing the field-magnet winding thereof, a source of electromotive force, a circuit interrupter for connecting the armature windings directly thereto, a plurality of circuit interrupters for also connecting the armature windings thereto through a plurality of transformers to provide a reduced voltage for starting the motor, said interrupters being so interlocked that the armature windings must be first connected to the source of electromotive force through the transformers, and means responsive to the energization of the motor-field-magnet winding and to a predetermined minimum value of current in the armature windings for actuating the first-mentioned interrupter and for simultaneously tripping the starting interrupters.

7. The method of starting a synchronous motor having a direct-connected exciter generator for energizing the field-magnet winding thereof which consists in connecting the armature windings to a source of reduced electromotive force and then precluding the actuation of the means for connecting the armature windings to the normal operating electromotive force until the motor-field-magnet winding is energized with direct current from the exciter generator and the current in the armature windings has decreased to a predetermined minimum value.

8. The method of starting a synchronous motor having a direct-connected exciter generator which consists in connecting the armature windings to a source of reduced electromotive force and then controlling the means for connecting the armature windings to the normal operating electromotive force in accordance with the direct current in the motor-field-magnet winding and the current in the armature windings.

9. In a system for starting a synchronous motor, the combination with a synchronous motor, a source of electromotive force, a starting circuit interrupter and a running interrupter, of means for actuating the starting interrupter, means responsive to direct current in the motor-field-magnet winding, and means responsive to a predetermined minimum value of alternating current in the armature windings for co-operating with the direct-current means to actuate the running interrupter.

10. In a system for starting a synchronous motor, the combination with a source of electromotive force, a starting circuit interrupter and a running interrupter, of means responsive to direct current in the motor-field-magnet winding, and means responsive to a predetermined minimum value of alternating current in the armature windings for co-operating to simultaneously close the running interrupter and trip the starting interrupter.

11. In an automatic synchronous motor-starting system, the combination with a direct-connected exciter, a source of normal electromotive force for the motor and means for providing a source of reduced electromotive force for starting the motor, of means responsive to predetermined conditions for connecting the motor to the source of reduced electromotive force, means responsive to a minimum value of starting current, and means responsive to the energization of the motor-field-magnet winding for connecting the motor to the source of normal electromotive force.

12. A system for starting a synchronous motor having its field-magnet windings energized from a direct-connected exciter generator comprising means for applying starting voltage to the motor, means for applying running voltage to the motor, and means for effecting transfer from application of starting to running voltage comprising a relay responsive to the current supplied to the motor field winding from the generator and a relay responsive to a condition indicative of the speed of the motor-generator unit.

13. A system for starting a synchronous motor having its field-magnet windings energized from a direct-connected exciter generator comprising means for applying starting voltage to the motor, means for applying running voltage to the motor, and means for controlling said voltage-applying means comprising means responsive to the excitation of the motor field magnet winding and means responsive to a condition indicative of the speed of the motor.

14. A system for starting a synchronous motor having its field-magnet windings energized from a direct-connected exciter generator comprising means for applying starting voltage to the motor, means for applying running voltage to the motor, and means for controlling said voltage-applying means comprising an electroresponsive device energized in accordance with the degree of excitation of the motor-field-magnet winding and an electroresponsive device energized to a degree dependent upon the speed of the motor.

15. A method of starting a synchronous motor having a direct-connected exciter generator, which consists in connecting the armature windings to a source of reduced electromotive force and then controlling the means for connecting the armature windings to the normal operating electromotive force in accordance with the direct current in the motor-field-magnet winding and with a predetermined speed condition in the motor.

16. A method of starting a synchronous motor having a direct-connected exciter generator, which consists in connecting the armature windings to a source of reduced electromotive force and then controlling the means for connecting the armature windings to the normal operating electromotive force in accordance with the direct current in the motor-field-magnet winding and with a condition indicative of synchronous speed of the motor.

17. A method of starting a synchronous motor having a direct-connected exciter generator for energizing the field-magnet winding of the motor, which consists in connecting the armature windings to a source of reduced electromotive force and then precluding the application of normal operating electromotive force until the motor attains a predetermined speed and the motor-field-magnet winding is energized with direct current from the exciter generator.

18. A system for starting a synchronous motor comprising a relay responsive to the direct-current energization of the motor-field-magnet windings and a relay responsive to the speed of the motor.

19. A system for starting a synchronous motor comprising a relay energized in accordance with the direct-current energization of the motor-field-magnet windings and a relay energized to a degree depending upon the speed of the motor.

20. A system for starting a synchronous motor comprising a relay and means responsive to the direct-current energization of the motor-field-magnet windings co-operating with means responsive to the speed of the motor to control the relay.

In testimony whereof, I have hereunto subscribed my name this 24th day of May, 1920.

ROY J. WENSLEY.